May 24, 1966 E. MUELBERGER, JR 3,252,252
PLANTING VESSEL WITH IRRIGATING MEANS
Filed Feb. 17, 1964 2 Sheets-Sheet 1

INVENTOR.
ERIC MUELBERGER, JR.
BY
JOHN P. CHANDLER
HIS ATTORNEY.

May 24, 1966  E. MUELBERGER, JR  3,252,252
PLANTING VESSEL WITH IRRIGATING MEANS
Filed Feb. 17, 1964  2 Sheets-Sheet 2

INVENTOR.
ERIC MUELBERGER, JR.
BY
JOHN P CHANDLER
HIS ATTORNEY.

United States Patent Office 3,252,252
Patented May 24, 1966

3,252,252
PLANTING VESSEL WITH IRRIGATING MEANS
Eric Muelberger, Jr., P.O. Box 132, Montrose Road,
Colts Neck, N.J.
Filed Feb. 17, 1964, Ser. No. 345,151
2 Claims. (Cl. 47—38)

This invention relates to ornamental planters in the form of a vessel or jar having a planting area at the top and a plurality of cup-shaped planting areas projecting from the side wall of the vessel at varying heights. These planting areas may communicate with the interior and are open at the top to facilitate the planting and growth of a variety of flowering, fruiting or other types of decorative plants.

Planters of this general type, made from ceramics, concrete or plastic materials, are widely used, both indoors and outdoors, since they are attractive in appearance and permit the growth of a variety of plants having similar requirements for moisture and environment. In addition, specimens may be planted in the separate areas at intervals, or early and late varieties used, to assure a succession of blooms, berries, foliage, or fruit in a single decorative container.

The principal difficulty with conventional planters of this type is that in order to supply the separate planting areas with a desired amount of water, without danger of over or under watering certain areas, individual applications to each area is necessary. This is time consuming. Alternatively, attempts to supply the total water needs of the individual plantings by a large single application to the upper central planting area are hazardous and quite unpredictable in effect. Hazardous, since unwanted erosion of the soil from the interior of the planter into the projecting planting areas usually occurs, and unpredictable, since the exact amount required to effect the desired osmotic dispersion to the projecting areas is difficult to estimate and under or over watering is the probable result.

An object of the present invention is to provide a multiple area planter with novel means for providing each area with an identical measure of water which is poured into a single receptacle at the top of the planter. This is accomplished by providing waterways which may be openings or spillways through which the water may pass. If these waterways are openings, they should all be of identical size leading from this annular receptacle into external open channels leading to the individual planting areas. If they are spillways, the area of each should be about the same so that an equal quantity of water should pass through each. The central area, being larger than the side wall areas, should receive more water by having more or larger openings or spillways.

Figure 1:
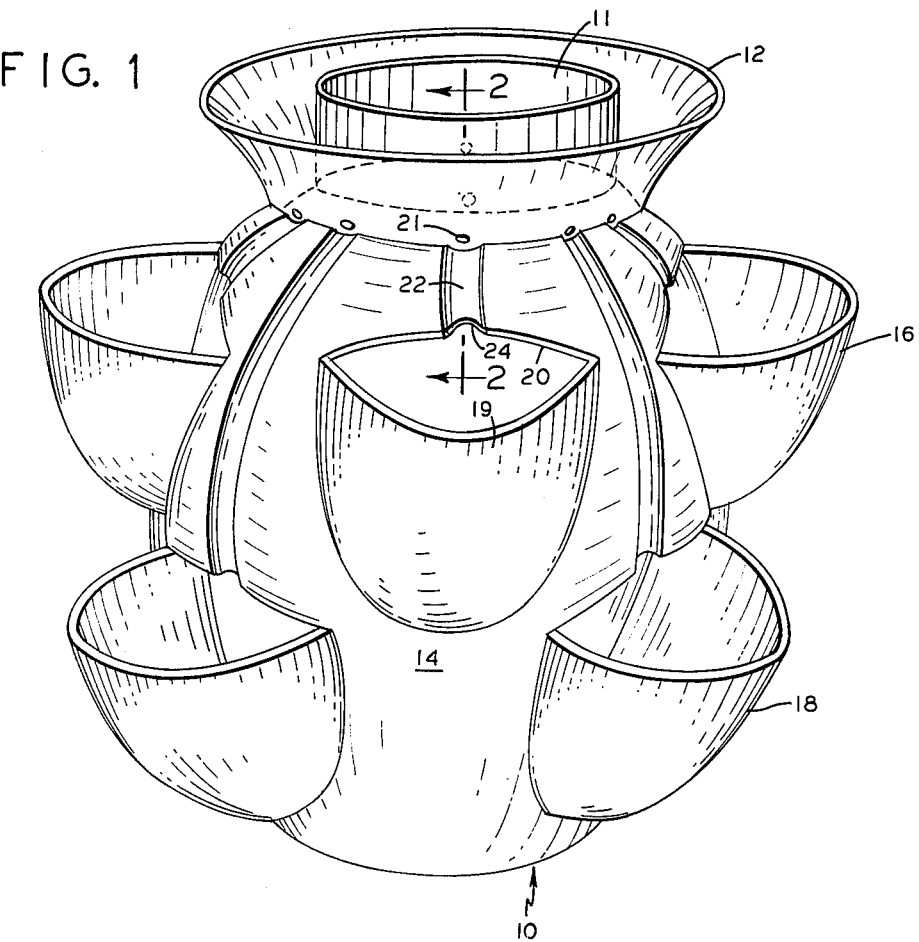
FIG. 1 is a perspective view of a planter embodying the present invention.

The embodiment of the invention chosen for illustration in FIG. 1 of the drawing is a substantially pear-shaped vessel 10 of any suitable ceramic or plastic material and having a top opening defined by a generally vertical rim 11 also defining the inner wall of an annular open top receptacle having an outwardly flared outer wall having a continuous rim 12. The circular side wall 14 of the vessel has a plurality of outwardly extending, generally cup-shaped projections 16 near the top and a plurality of lower projections 18, the upper and lower projections being disposed in staggered relation to give the vessel a symmetrical appearance.

The area of the circular side wall defined by each of the curved cup-shaped projections is open so that the internal areas of the projections are in communication with the larger central interior portion. Each cup-shaped projection has an open top defined by an outer edge 19 and an inner edge 20.

Figure 2:
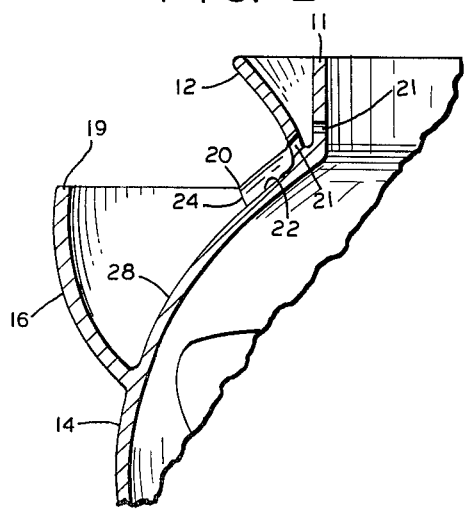
FIG. 2 is a broken section taken on line 2—2 of FIG. 1 and shows a modification.

FIG. 2 is a section taken on line 2—2 of FIG. 1 and further shows a modification wherein the cup-shaped projection is not in communication with the central section of the vessel but rather is closed therefrom by a wall 28 forming a continuation of wall 14.

In use, the planter of the present invention, as illustrated in the embodiment shown in FIG. 1, is filled with potting soil to the optimum level in both the upper central and the projecting cup-like areas and the separate areas planted with seeds, bulbs or other decorative foliage, flowering or fruit bearing plant material. Watering all areas is accomplished by pouring into the annular distributing receptacle which distributes the water, in any desired quantity, to all the planting areas simultaneously by means of the openings and channels provided. It is to be noted that the upper central planting area, which does not require water directing channels, is usually dimensionally larger than the projecting planting areas. Under these conditions, a larger water outlet opening or preferably, a plurality of smaller outlet openings spaced around the perimeter of the area will be necessary in order to supply the relatively greater requirements of this area.

Figure 3:
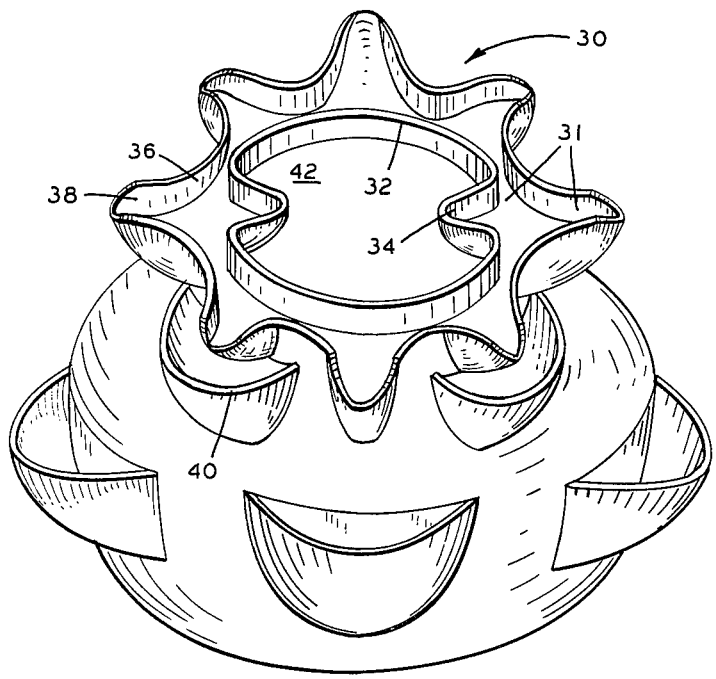
FIG. 3 is a perspective view showing a modification.

Another embodiment, shown in FIG. 3, employs a vessel 30 having an annular channel 31 having a generally circular inner wall 32 with inwardly disposed waterways or spillways 34 and an irregular outer wall 36 having outwardly disposed spillways 38 forming a plurality of pouring spouts or openings. Each of the outwardly disposed spouts or openings terminate at a point vertically above each of the projecting planting areas 40 and each of the inwardly disposed spouts or openings terminate at a point vertically above the upper central planting area 42. This embodiment requires no channels in the wall of the vessel, for the purpose of directing water to the projecting planting areas, and in use, water poured into the distributing receptacle will fall from the spouts or openings onto the planting areas directly beneath. Such embodiment will probably find its greatest use in the larger planter sizes which are generally used as decorative accessories on outdoor patios, terraces or garden steps where splashing or spilling of water are of small consequence and where gravel or other aggregate material can conveniently be applied to the top surface of the soil in the projecting planting areas to minimize or prevent soil displacement caused by the force of falling water.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A multiple area planter comprising a vessel having an opening at its upper end and a downwardly inclined sidewall provided with a plurality of generally cup-shaped projections on its outer surface, the tops of which are open, an annular, water-receiving and distributing receptacle adjacent and disposed around the upper end of the vessel and having a plurality of openings therein, the outer wall of the vessel having a plurality of open channels formed therein with one channel leading from each of said openings downwardly to each of the cup-shaped projections so that water introduced into the receptacle will pass through the openings and flow downwardly into the open-top projections which form planting areas.

2. A multiple area planter comprising a vessel having an opening at its upper end forming one planting area and a downwardly inclined sidewall provided with a plurality of generally cup-shaped projections on its outer surface, the tops of which are open, and the interiors of which are in communication with the interior of the vessel, the opening at said upper end of the vessel being surrounded by a water-receiving and distributing receptacle, said receptacle including inner and outer walls joined at their lower edges with said upper end of the vessel, said walls having continuous rims around their upper edges, said inner and outer walls of the receptacle having openings therein, at least one of the openings being in the inner wall and leading to said upper open end of the vessel, the outer wall of the vessel having a plurality of open channels leading from each of the openings in the receptacle outer wall and downwardly to each of the cup-shaped projections so that water introduced into the receptacle will pass through the openings and flow downwardly into the open-top projections which form planting areas.

References Cited by the Examiner

UNITED STATES PATENTS

| | | | |
|---|---|---|---|
| 262,335 | 8/1882 | Wagner | 47—34.12 |
| 1,217,239 | 2/1917 | Swartz | 47—34.12 X |
| 1,555,675 | 9/1925 | Kruszynski | 47—38.1 |
| 1,740,057 | 12/1929 | Babich | 47—34.12 |
| 3,063,196 | 11/1962 | Pauer | 47—34.12 |

ABRAHAM G. STONE, *Primary Examiner.*

J. O. BOLT, *Assistant Examiner.*